United States Patent
Rosthauser et al.

(10) Patent No.: US 8,124,665 B2
(45) Date of Patent: Feb. 28, 2012

(54) DECORATIVE MOLDED FOAMS WITH GOOD IMPACT RESISTANCE AND FIRE RETARDANT PROPERTIES

(75) Inventors: James W. Rosthauser, Pittsburgh, PA (US); Theodore S. Frick, Moon Township, PA (US); Michael T. Wellman, Moundsville, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 289 days.

(21) Appl. No.: 12/231,212

(22) Filed: Aug. 29, 2008

(65) Prior Publication Data

US 2010/0056659 A1    Mar. 4, 2010

(51) Int. Cl.
*C08G 18/28*    (2006.01)

(52) U.S. Cl. .......... 521/176; 521/99; 521/103; 521/107; 521/108; 521/123; 521/130; 521/170; 521/172; 521/173; 521/174

(58) Field of Classification Search ............. 521/103, 521/107, 108, 123, 130, 170, 172, 173, 174, 521/99, 176
See application file for complete search history.

(56) References Cited

U.S. PATENT DOCUMENTS

| | | | |
|---|---|---|---|
| 4,258,141 A * | 3/1981 | Jarre et al. ............... | 521/114 |
| 4,797,428 A | 1/1989 | Reichmann | |
| 4,895,878 A * | 1/1990 | Jourquin et al. ........... | 521/103 |
| 4,940,632 A | 7/1990 | Nicola et al. | |
| 5,086,084 A | 2/1992 | Michaelson | |
| 5,877,227 A | 3/1999 | Murty | |
| 6,031,010 A | 2/2000 | Lin | |
| 6,559,196 B2 * | 5/2003 | Narayan et al. ........... | 521/174 |
| 2004/0176510 A1 | 9/2004 | Geprags | |
| 2006/0100295 A1 * | 5/2006 | Heraldo et al. ........... | 521/99 |
| 2007/0129452 A1 | 6/2007 | Clatty et al. | |

FOREIGN PATENT DOCUMENTS

GB    2094315 A    9/1982

* cited by examiner

*Primary Examiner* — John Cooney
(74) *Attorney, Agent, or Firm* — N. Denise Brown; Noland J. Cheung

(57) ABSTRACT

This invention relates to fire-resistant, flexible, molded, medium density polyurethane foams. These foams typically have a density of from 10 to 30 pcf. The foams are the reaction product of a) at least one polyester polyol, b) at least one highly branched polyether polyol, c) at least one chain extender, d) a polymethylene poly(phenyl isocyanate), an isocyanate group containing prepolymer based on a polymethylene poly(phenyl isocyanate), or mixtures thereof, e) a solid flame retardant and f) water. This invention also relates to a process for preparing these polyurethane foams in open molds.

20 Claims, No Drawings

DECORATIVE MOLDED FOAMS WITH GOOD IMPACT RESISTANCE AND FIRE RETARDANT PROPERTIES

BACKGROUND OF THE INVENTION

This invention relates to decorative molded foams which exhibit good impact resistance and good fire retardant properties. This invention also relates to a process for preparing these decorative molded foams. The molded foams of the present invention are flexible and have a medium density, i.e. the density ranges from about 10 to about 30 pounds per cubic foot (pcf). These foams are suitable for use as building materials in the construction industry.

Polyurethane foams are used for a wide variety of applications, such as thermal insulation, packaging, upholstery, carpet underlay, automobile dashboards, building materials, and structural material. An important factor to be considered in employing polyurethane or other polymeric foams is the ability of such foams to resist ignition, or once ignited, to be self-extinguishing after the ignition source is removed. This factor becomes even more important if the foam is to be used within a confined space or in fire-prone outdoor locations.

As those skilled in the art are aware, the most common method of decreasing the flammability of polyurethane foams is by incorporating a flame retarding agent, such as a halogen- or phosphorus-containing compound, into the foam formulation. Although such compounds provide good improvement in the flame retardation properties, relatively large quantities of these agents may have to be employed to obtain satisfactory results in more severe tests. Incorporating large quantities of these agents into polyurethane foams usually results in loss of impact strength and flexibility.

For many years, the dominant blowing agents used to expand polyurethane foam had been the cholorfluorocarbons. These blowing agents were phased out after having been determined to pose a threat to stratospheric ozone. After the cholorfluorocarbons were phased out, the most common class of blowing agents became the hydrogenated chlorofluorocarbons. Although these are considered to be somewhat more environmentally friendly expansion agents, the hydrogenated chlorofluorocarbons still contain some chlorine. The chlorine atoms of hydrogenated chlorofluorocarbons are stable at altitudes under the stratosphere, and thus have a lower ozone-depleting potential ("ODP"). However, because of the hydrogenated chlorofluorocarbons still have a small ODP, they have also been mandated for eventual phase out. Water and/or carbon dioxide are rapidly becoming the blowing agents of choice for polyurethane foam manufacturers.

As described in U.S. Pat. Nos. 4,797,428 and 4,940,632, there are some polyurethane foams available that pass the ASTM E84 Tunnel Test "Standard Test Method for Surface Burning Characteristics of Building Materials" (ASTM International) with a Class I rating. These foams use the alternative chlorofluorocarbon/hydrogenated chlorofluorocarbon blowing agents in combination with highly loaded polyester polyol blends and liquid flame retardants or have high flame retardant filler loadings, including phosphorus-based materials, in combination with trimethylolpropane-based polyols to produce the desired end result. These polyester-containing foams tend to reduce long term hydrolytic and "creep" stability and thus are not suitable for applications outside of insulation-type foams. These insulation foams normally have density less than 4 pcf and are brittle with little or no impact resistance.

U.S. Pat. No. 5,086,084 discloses a foamed polymeric material suitable as a wood substitute, made of a continuous phase of polyurethane having solid polyvinyl chloride particles dispersed therein. The wood-like material of this reference contains about 100 parts of a foamable urethane, and 10 to 50 parts polyvinyl chloride (PVC) particles having a particle size below 200 µm. This material has a microcellular structure with cells on the order of 0.1 mm in average diameter or less. The walls are said to be made of a matrix of polyurethane reinforced with PVC particles. There is no discussion of the flame resistant performance properties of these polymeric materials.

Water-blown, flame retardant rigid polyurethane foams which satisfy the requirements of ASTM E-84 for Class I materials are disclosed in U.S. Published Patent Application 2007/0129452. These rigid foams are the reaction product of at least one polyisocyanate, with a polyol component that contains from 2 to 35 wt. % of at least one sucrose based polyol, from 2 to 35 wt. % of at least one non-sucrose based isocyanate-reactive component, and from 1 to 13 wt. % of at least one aromatic polyester polyol, in the presence of water, optionally at least one of carbon dioxide, surfactants, flame retardants, pigments, and catalysts and fillers. These foams do not contain any trimethylolpropane based polyols.

Finally, flame-proofed thermoplastic molding compounds are disclosed in U.S. Published Patent Application 2004/0176510. These are the reaction product of A) from 10 to 97% by weight of at least one polyester, B) from 1 to 30% by weight of flame-retardant component, C) from 0.01 to 5% by weight of $KH_2PO_4$ or $LiH_2PO_4$, and E) from 0 to 70% by weight of other additives, with the sum of the percentages of A) through E) totaling 100% by weight. Suitable polyesters include polyethylene terephthalate (PET) and at least one polyester other than polyethylene terephthalate (PET). Up to 30 mol % of the dicarboxylic acids used to prepare the non-PET polyester can be adipic acid. The halogen-containing flame retardant contains 1 to 30% by weight of a halogen-containing flame-retardant, and from 1 to 80% by weight of an antimony oxide. This reference does not, however, mention flexible molded polyurethane foams.

Thus, there continues to be a need for flexible molded polyurethane foams which have good impact strength and good fire retardant properties. It is also desirable that such foams would use non chlorofluorocarbon/hydrogenated chlorofluorocarbon-containing blowing agents, such as water and/or carbon dioxide.

SUMMARY OF THE INVENTION

This invention relates to a fire-resistant, flexible, molded, medium density (i.e. 10 to 30 pcf) polyurethane foam, and to a process for the production of this foam.

The fire-resistant, flexible, molded, medium density polyurethane foam comprises:
a) 10 to 30 parts by weight of at least one polyester polyol having a functionality of from 1.5 to 3.0 and an OH number of from 25 to 250, and which comprises the reaction product of
(i) one or more aliphatic dicarboxylic acids, with
(ii) one or more diols or triols;
b) 5 to 15 parts by weight of at least one highly branched polyether polyol having a functionality of 3.0 to 8.0 and an OH number of 250 to 750 (and is preferably prepared by alkoxylating sucrose or mixtures of sucrose with water and/or propylene glycol)
c) 5 to 15 parts by weight of at least one chain extender having a functionality of from 2.0 to 2.9 and an OH number of from 400 to 1900;

d) 30 to 55 parts by weight of a polymethylene poly(phenylisocyanate), an isocyanate group containing prepolymer (or quasi-prepolymer) based on a polymethylene poly(phenylisocyanate) or mixtures thereof, in which the isocyanate component has an NCO group content of from 25 to 33% by weight;

e) 10 to 35 (preferably 25 to 35) parts by weight of solid flame retardant;

and f) a sufficient quantity of water to provide blowing to achieve a free rise density (FRD) from 8 to 20 pcf in the resultant polyurethane foam, with the sum of components a), b), c), d) and e) totaling 100 parts by weight.

The process of preparing the fire-resistant, flexible, molded, medium density polyurethane foam comprises:

(1) introducing a polyurethane foam forming composition into an open mold, (2) closing the mold, (3) allowing the composition to react, and (4) removing the molded polyurethane foam from the mold, wherein the polyurethane foam forming composition comprises:

a) 10 to 30 parts by weight of at least one polyester polyol having a functionality of from 1.5 to 3.0 and an OH number of from 25 to 250, and which comprises the reaction product of
  (i) one or more aliphatic dicarboxylic acids, with
  (ii) one or more diols or triols;

b) 5 to 15 parts by weight of at least one highly branched polyether polyol having a functionality of 3.0 to 8.0 and an OH number of 250 to 750 (and is preferably prepared by alkoxylating sucrose or mixtures of sucrose with water and/or propylene glycol)

c) 5 to 15 parts by weight of at least one chain extender having a functionality of from 2.0 to 2.9 and an OH number of from 400 to 1900;

d) 30 to 55 parts by weight of a polymethylene poly(phenyl isocyanate), a isocyanate group containing prepolymer (or quasi-prepolymer) based on a polymethylene poly(phenyl isocyanate), or mixtures thereof, in which the isocyanate component has an NCO group content of from 25 to 33% by weight;

e) 10 to 35 (preferably 25 to 35) parts by weight of solid flame retardant;

and f) a sufficient quantity of water to provide blowing to achieve a free rise density (FRD) from 8 to 20 pcf in the resultant polyurethane foam, with the sum of the parts by weight of components a), b), c), d) and e) totaling 100 parts by weight.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

In accordance with the present invention, suitable polyester polyols to be used as component herein include those having a functionality of from about 1.5 to about 3.0 OH groups per molecule and which are characterized by an OH number of from about 25 to about 250. These polyester polyols are the reaction products of (i) one or more aliphatic dicarboxylic acids with (ii) one or more diols or triols.

The polyester polyols of the present invention typically have an OH number of at least 25, preferably at least 35 and most preferably at least 55. These polyester polyols also typically have an OH number of less than or equal to 250, preferably less than or equal to 200 and more preferably less than or equal to 150. The polyester polyol may have an OH number ranging between any combination of these upper and lower values, inclusive, e.g., from 25 to 250, preferably from 35 to 200, and more preferably from 55 to 150.

Suitable aliphatic dicarboxylic acids for preparing the polyester polyols herein include, for example, saturated or unsaturated $C_4$ to $C_{12}$ aliphatic acids, including branched, unbranched, or cyclic materials such as succinic acid, glutaric acid, adipic acid, pimelic acid, suberic acid, maleic acid, fumaric acid, azelaic acid, sebacic acid, 1,11-undecanedioc acid, 1,12-dodecanedioic acid, 1,4-cyclohexanedicarboxylic acid, 2-methylpentanedioic acid, 1,4-cyclo-2-hexenedicarboxylic acid, etc. Preferred aliphatic dicarboxylic acids are succinic acid, glutaric acid, adipic acid and mixtures thereof.

Suitable diols and triols to be reacted with the aliphatic dicarboxylic acids in preparing the polyester polyols herein include compounds such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane and mixtures thereof, etc. Preferred diols and triols for preparing the polyester polyols are diethylene glycol, ethylene glycol, butylene glycol, neopentyl glycol, and mixtures thereof.

In a preferred embodiment of the present invention, it is preferred that polyethylene terephthalates are not used as part of the polyester polyol herein.

Suitable highly branched polyether polyols to be used as component b) herein typically have a functionality of from about 3.0 to about 8.0 and an OH number of from about 250 to about 750. These polyether polyols are the reaction products of (i) one or more suitable initiator or starter compound with (ii) one or more alkylene oxides. In addition, the functional groups of these highly branched polyether polyols are hydroxyl groups.

Typically, these polyether polyols have an OH functionality of at least 3.0, preferably at least 3.5 and more preferably at least 4.0. These polyether polyols also typically have an OH functionality of less than or equal to 8.0, preferably less than or equal to 7.0 and more preferably less than or equal to 6.0. The polyether polyols of the invention may have an OH functionality ranging between any combination of these upper and lower values, inclusive, e.g. from 3.0 to 8.0, preferably from 3.5 to 7.0 and more preferably from 4.0 to 6.0.

The polyether polyols of the present invention typically have an OH number of at least 250, preferably at least 300 and most preferably at least 350. These polyether polyols also typically have an OH number of less than or equal to 750, preferably less than or equal to 650 and more preferably less than or equal to 550. The polyether polyols may have an OH number ranging between any combination of these upper and lower values, inclusive, e.g., from 250 to 750, preferably from 300 to 650, and more preferably from 350 to 550.

The suitable polyether polyols of the present invention are highly branched polyether polyols. As used herein, the term highly branched means polyol mixtures comprising one or more polyols with functionality of 3.0 to 8.0 in admixture with one or more polyols with functionality of 1.5 to 3.0 such that the average functionality of the mixture is greater than 3.0 but less than 8.0.

These polyether polyols are prepared by reacting one or more suitable initiator or starter compounds with one or more alkylene oxides, in the presence of at least one suitable catalyst. Suitable highly branched polyether polyols can be prepared, for example, by the polymerization of epoxides such as ethylene oxide, propylene oxide, butylene oxide, tetrahydrofuran, styrene oxide, or epichlorohydrin, optionally in the presence of a catalyst such as KOH or $BF_3$, or by chemical addition of such epoxides, optionally as mixtures or successively, to starting components containing reactive hydrogen atoms, such as alcohols, or amines, or water in admixture with one or more other suitable starting compounds. Examples of such starting compounds for the highly branched polyether polyols include, but are not limited to trimethyolethane, trimethylolpropane, glycerol, pentaerythritol, 4,4'-dihydroxydiphenylpropane, sorbitol, sucrose, ethylenediamine, monoethanolamine, triethanolamine, toluenediamine, ethylene glycol, 1,2- or 1,3-propanediol, 1,2-, 1,3- or 1,4-butanediol, glycerin, pentaerythritol, 4,4'-dihydroxydiphenylpropane, aniline, 2,4- or 2,6-diaminotoluene, ammonia, ethanolamine, triethanolamine, and ethylene diamine and mixtures thereof. Preferred starter or initiator compounds are sucrose, and mixtures of sucrose with water and/or propylene glycol.

Suitable chain extenders to be used as component c) in accordance with the present invention have hydroxyl functionalities of from 2.0 to 2.9 and an OH number of from 400 to 1900. The functional groups of suitable chain extenders to be used herein are hydroxyl groups. Chain extenders preferably have a functionality of 2.0 to 2.5. Obviously, functionalities such as 2.5 are prepared by a mixture of a difunctional chain extender and a trifunctional chain extender.

Typically, the chain extenders of the present invention have an OH number of at least 400, preferably at least 600 and most preferably at least 750. These polyether polyols also typically have an OH number of less than or equal to 1900, preferably less than or equal to 1300 and more preferably less than or equal to 1100. The polyether polyols may have an OH number ranging between any combination of these upper and lower values, inclusive, e.g., from 400 to 1900, preferably from 600 to 1300, and more preferably from 750 to 1100.

Some examples of suitable chain extenders to be used herein include ethylene glycol, 1,2- and 1,3-propanediol, 1,3-, 1,4- and 2,3-butanediol, 1,6-hexanediol, 1,8-octanediol, 1,10-decanediol, neopentyl glycol, 1,3- and 1,4-bis(hydroxymethyl)cyclohexane, 2-methyl-1,3-propanediol, diethylene glycol, triethylene glycol, tetraethylene glycol, polyethylene glycols, dipropylene glycol, tripropylene glycol, polypropylene glycols, dibutylene glycol, tributylene glycol, polybutylene glycols, cyclohexanedimethanol, 2-methyl-1,3-propanediol, and 2,2,4-trimethylpentane-1,3-diol. Also suitable are mixtures of the above chain extenders with higher functional compounds such as glycerol and/or trimethylolpropane, provided that the overall functionality of the mixture falls with the required range for chain extenders described herein. Any of the previously mentioned diols that are disclosed herein as being suitable for preparing polyesters are also suitable as chain extenders in accordance with the present invention. Preferred chain extenders are diethylene glycol and tripropylene glycol.

In accordance with the present invention, component d) comprises a polymethylene poly(phenyl isocyanate), an isocyanate group containing prepolymer based on a polymethylene poly(phenyl isocyanate), or mixtures thereof, having an NCO group content of 25 to 33% by weight. It is more preferred that the polyisocyanates for the presently claimed invention are compositions having a functionality of from about 2.1 to about 3.8, and an NCO group content of about 25% to about 33%, a viscosity of less than about 1000 mPa·s at 25° C.

The polyisocyanates will typically have an NCO functionality of at least 2.1, preferably at least 2.3 and more preferably at least 2.5. These polyisocyanates also typically have an NCO functionality of less than or equal to 3.8, preferably less than or equal to 3.5 and more preferably less than or equal to 3.2. The polyisocyanates of the invention may have an NCO functionality ranging between any combination of these upper and lower values, inclusive, e.g. from 2.1 to 3.8 preferably from 2.3 to 3.5 and more preferably from 2.5 to 3.2.

The polyisocyanates of the present invention typically have an NCO group content of at least 25% by weight, preferably at least 27.5% by weight and most preferably at least 29% by weight. These polyisocyanates also typically have an NCO group content of less than or equal to 33% by weight, preferably less than or equal to 32% by weight and more preferably less than or equal to 31% by weight. Suitable polyisocyanates may have an NCO group content ranging between any combination of these upper and lower values, inclusive, e.g., from 25% to 33% by weight, preferably from 27.5% to 32% by weight, and more preferably from 29% to 31% by weight.

It is most preferred that the polyisocyanates have an NCO group content of from 27.5% to 32% and a functionality of from 2.3 to 3.5. Suitable polyisocyanates satisfying this NCO group content and functionality include, for example, polymethylene poly(phenyl isocyanates) and prepolymers (or quasi-prepolymers) thereof having the required NCO group content and functionality.

Polymeric MDI as used herein, refers to polymethylene poly(phenyl isocyanate) which in addition to monomeric diisocyanate (i.e., two-ring compounds) contains three-ring and higher ring containing products.

A particularly preferred polyisocyanate comprises a polymethylene poly-(phenylisocyanate) having an NCO content of about 31.5%, a functionality of about 2.8, a viscosity of about 200 mPa·s at 25° C.

Suitable prepolymers to be used as component d) herein include those prepared by reacting an excess of a polymethylene poly(phenyl isocyanate) with an isocyanate-reactive component to form an NCO terminated prepolymer. Such isocyanate-terminated prepolymers are disclosed in U.S. Pat. No. 5,962,541, the disclosure of which is hereby incorporated by reference. In the practice of the present invention, the polymeric diphenylmethane diisocyanate is reacted with a polyol, preferably a polyester polyol or a polyol blend having a functionality of from about 1.8 to about 4, and a number average molecular weight (as determined by end-group analysis) of from about 400 to about 2000. These quasi-prepolymers should have functionalities and NCO group contents within the ranges set forth above.

Suitable polyols for preparing the isocyanate-terminated prepolymers herein typically have a functionality of at least about 1.8, and more preferably at least about 1.9. These polyols also typically have functionalities of less than or equal to about 4, more preferably less than or equal to about 2.4, and more preferably less than or equal to about 2.2, In addition, the polyol may have a functionality ranging between any combination of these upper and lower values, inclusive, e.g. from 1.8 to 4, preferably from 1.8 to 2.4, and more preferably from 1.9 to 2.2.

The polyols used to prepare the isocyanate-terminated prepolymers herein also typically have a number average molecular weight of at least about 400, and more preferably at least about 450. These polyols also typically have a number average molecular weight of less than or equal to 2000, preferably less than or equal to 800 and most preferably less than or equal to 500. These polyols may also have number average molecular weights ranging between any combination of these upper and lower values, inclusive, e.g. from 400 to 2000, preferably from 400 to 800, and more preferably from 450 to 500.

A particularly preferred polyisocyanate prepolymer comprises the reaction product of polymethylene poly(phenylisocyanate) and a 450 molecular weight polyester having an NCO group content of about 30.5%, a functionality of about 2.8, and a viscosity of about 350 mPa·s at 25° C.

Suitable solid flame retardants to be used in accordance with the present invention include compounds such as zinc borates; and phosphates such as, for example, ammonium polyphosphate, and various cyclic phosphate and phosphonate esters, and reactive oligomeric organophosphates having functionalities greater than 1; melamine; antimony oxides such as, for example, antimony pentoxide and antimony trioxide; aluminum compounds such as, for example, alumina trihydrate; magnesium compounds such as, for example, magnesium hydroxide; urea; and solid halogen-containing compounds such as brominated diphenyl ether as well as other brominated aromatic and aliphatic compounds. Other solid flame retardants include, for example, colloidal-sized particles of hydrated salts, molybdenum compounds, metallocenes, bismuth compounds, etc. as described in U.S. Pat. Nos. 5,695,691 and 5,948,323, the disclosures of which are hereby incorporated by reference. Zinc borates suitable for use as flame retardants include those corresponding such as, for example, $2ZnO.3B_2O_3.5H_2O$, $2ZnO.3B_2O_3.3.5H_2O$, $2ZnO.3B_2O_3$, $4ZnO.B_2O_3.H_2O$, etc. Such zinc borates are commercially available from Rio Tinto Borax under the tradename Firebrake®. It is preferred that the flame retardant comprise at least zinc borate.

In accordance with the present invention, the amount of solid flame retardant ranges from 10 to 35 parts by weight, and preferably from 25 to 35 parts by weight.

In a preferred embodiment of the present invention, when the flame retardant additionally contains a phosphorus containing material, it is preferred that the polyether polyol, i.e. component b), is started from a compound other than trimethylolpropane.

Liquid flame retardants known to those skilled in the art can be and most often are used to reduce viscosity in systems that contain solid flame retardants. Although they reduce viscosity of the polyol portion to ease handling and processing of the polyurethane, they do not improve but rather also decrease the impact resistance of the resulting polyurethanes.

The liquid flame retardant materials useful herein are also known in the art, and are commercially available. Useful liquid flame retardants include but are not limited to phosphates and phosphonates such as, for example, PHT-4 DIOL, available from Chemtura Corporation (or the equivalent Ethyl Corporation product, Saytex® RB-79), tris(chloropropyl) phosphate (Fyrol® PCF, available from Supresta Chemical), tris(chloroethyl)phosphate (Fyro® CEF, available from Supresta Chemical), tris(1,3-dichloro-1-propyl)phosphate (Fyrol® 38, available from Supresta Chemical), tris(2,3-dichloro-1-propyl)phosphate. (Fyrol® FR-2, available from Supresta Chemical), triethyl phosphate (Fyrol® TEP available from Supresta Chemical), Antiblaze® 80, available from Albemarle, Antiblaze® 500, available from Albemarle, Ixol® B-251 and Ixol® 350, both available from Solvayfluor, and dimethylmethyl phosphonate.

Water is used as the sole blowing agent in the polyurethane foams of the present invention. The quantity of water is sufficient to provide adequate blowing such that the resultant polyurethane foam has a FRD (free-rise density) of from 8 to 20 pcf. Thus, in general, the amount of water present ranges from about 0.1 to about 1% by weight, based on 100% by weight of the sum of components a), b), c) and d)).

In the present invention, the sum of the parts by weight of components a) through e) totals 100 parts by weight.

Other potential additives and auxiliary agents to be included in the polyurethane foam compositions herein include, for example, catalysts, surface-active additives such as emulsifiers and foam stabilizers, as well as, for example, known internal mold release agents, pigments, cell regulators, plasticizers, dyes, fillers and reinforcing agents such as glass in the form of fibers or flakes or carbon fibers. Polyvinyl chloride is incorporated as a filler.

Polyvinyl chloride is produced by polymerizing vinyl chloride by suspension, emulsion, or solution methods. It is often copolymerized with up to 50% other compatible monomers. PVC is processed by several methods including blow molding, extrusion, calendering, and coating. Plastisols comprising PVC resin particles dispersed in a liquid phase of a PVC plasticizer are used to produce coatings and molded products. PVC is resistant to weathering, moisture, most acids, fats, petroleum hydrocarbons and fungi. It is dimensionally stable, and has good dielectric properties. It is used for piping and conduits, containers, liners, and flooring.

Polyvinyl chloride resins useful herein are also well-known copolymers rich in vinyl chloride moieties. They may include up to about 50% by weight of a comonomer such as other vinyls or an acrylate. Alternatively, particles may be purchased commercially from manufacturers such as Goodyear Tire and Rubber Corp., B.F. Goodrich, Westchem International, and Tenneco, Inc. Broadly, the invention may utilize mixtures of particles having diameters below about 200 microns. The molecular weight of the PVC may vary widely. PVC's having an average molecular weight within the range of about 80,000 to about 500,000 or higher may be used. Generally, the molecular weight (or inherent viscosity) is not an important factor.

Some examples of suitable catalysts, include tertiary amine catalysts and organometallic catalysts. Some examples of suitable organometallic catalysts include, for example organometallic compounds of tin, lead, iron, bismuth, mercury, etc. Also suitable are heat-activated amine salts as catalysts. These include both aliphatic and aromatic tertiary amines. It is preferred to use heat activated amine salts as catalysts.

Examples of emulsifiers and foam stabilizers include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/-oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers also include polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

The polyurethane foam compositions according to the present invention may be molded using conventional processing techniques at isocyanate indexes ranging from about 90 to 150 (preferably from 100 to 130). By the term "Isocyanate Index" (also commonly referred to as "NCO index"), is defined herein as the equivalents of isocyanate, divided by the total equivalents of isocyanate-reactive hydrogen containing materials, multiplied by 100.

An open mold is one that the reacting materials are not injected into, but rather poured into. The materials suitable for processing in open molds are normally characterized by having a slightly longer gel time and curing time than those used in the closed mold (typical RIM) processes.

In the process of preparing molded polyurethane foams from these foam forming compositions, one typically introduces a polyurethane foam forming composition into an open mold, closes the mold, allows the composition to react, and removes the molded polyurethane foam from the mold. Suitable information in terms of relevant conditions, suitable molds, demold times, end uses, etc. are known by those skilled in the art. It is preferred that the free rise density of foam is between 8 and 20 pcf (pounds per cubic foot) and that the molded density of the foams is between 12 and 24 pcf.

It is also possible, but less preferred, to use a traditional RIM process or other closed mold process to prepare molded parts from the polyurethane foam forming compositions described herein.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The present invention is further illustrated, but is not to be limited, by the following examples. All quantities given in "parts" and "percents" are understood to be by weight, unless otherwise indicated.

The following components were used in the working examples:

| | |
|---|---|
| POLYOL A: | an aliphatic polyester polyol (i.e. a polyethylene/polybutylene adipate) having a functionality of two and a hydroxyl number of 55 |
| POLYOL B: | an aromatic polyester polyol having a functionality of 2 and a hydroxyl number of 185, commercially available as TEROL ® 198 from Oxid |
| POLYOL C: | an aromatic polyester polyol having a functionality of 2 and a hydroxyl number of 240, commercially available as Stepanpol ® PS-2502 from Stepan |
| POLYOL D: | a sucrose-initiated polyether polyol having an OH number of about 470 mg KOH/g and a functionality of 5.2 |
| POLYOL E: | diethylene glycol |
| POLYOL F: | a glycerine-initiated polyether polyol having an OH number of about 60 mg KOH/g and a functionality of 3 |
| SURFACTANT A: | polyalkylene oxide methyl siloxane copolymer commercially available as NIAX ® L 1000 from Momentive Performance Materials of Albany, NY |
| CATALYST A: | an acid blocked amine blowing catalyst, commercially available as Niax ® A-507 from Momentive Performance Materials of Albany, NY |
| CATALYST B: | an acid blocked amine gelling catalyst, commercially available as Niax ® A-537 from Momentive Performance Materials of Albany, NY |
| CATALYST C: | an acid blocked amine gelling catalyst, commercially available as Niax ® A-577 from Momentive Performance Materials of Albany, NY |
| ISOCYANATE A: | a modified polymeric methylene (diphenyl diisocyanate) having an NCO content of about 30.4% |
| PVC A: | particles of polyvinyl chloride, commercially available as GEON ® 121AR from Geon, Inc. of Akron, Ohio |
| FLAME RETARDANT A: | ammonium polyphosphate, commercially available as Exolit ® AP- 422 from Clariant Corp. of Charlotte, NC |
| FLAME RETARDANT B: | alumina trihydrate, commercially available as Hubercarb ® SB 122 from Huber Engineered Materials of Atlanta, GA |
| FLAME RETARDANT C: | zinc borate, commercially available as Firebreak ® ZB from U.S. Borax, Inc. of Valencia, CA |
| PIGMENT A: | Brown iron oxide pigment, commercially available as DPU-B2371-2B from Ricon Color Inc. of West Chicago, IL |

Example 1 and Comparative Examples 2-5

Rigid foams were made by combining the components in the amounts given below in Table I. Processing details for these foams are also given below in Table I.

TABLE I

| Formulation Details | Ex. 1 | Ex. C2 | Ex. C3 | Ex. C4 | Ex. C5 |
|---|---|---|---|---|---|
| POLYOL A | 48.10 | | | | |
| POLYOL B | | 54.51 | — | 31.51 | 28.00 |
| POLYOL C | | — | 58.10 | — | — |
| POLYOL D | 28.86 | 28.86 | 28.86 | 28.86 | 20.35 |
| POLYOL E | 19.40 | 13.00 | 9.40 | 16.00 | 20.00 |
| POLYOL F | | | | 20.00 | 28.00 |
| SURFACTANT A | 0.866 | 0.866 | 0.866 | 0.866 | 0.866 |
| WATER | 0.818 | 0.810 | 0.810 | 0.810 | 0.811 |
| CATALYST A | 0.057 | 0.057 | 0.057 | 0.057 | 0.057 |
| CATALYST B | 0.342 | 0.342 | 0.342 | 0.342 | 0.342 |
| CATALYST C | 0.342 | 0.342 | 0.342 | 0.342 | 0.342 |

TABLE I-continued

| Formulation Details | Ex. 1 | Ex. C2 | Ex. C3 | Ex. C4 | Ex. C5 |
|---|---|---|---|---|---|
| ISOCYANATE A | 136.9 | 138.9 | 139.1 | 139.3 | 139.5 |
| FLAME RETARDANT A | 21.76 | 21.20 | 21.21 | 21.23 | 21.25 |
| FLAME RETARDANT B | 50.96 | 49.54 | 49.57 | 49.62 | 49.65 |
| FLAME RETARDANT C | 6.73 | 6.52 | 6.53 | 6.533 | 6.538 |
| PVC A | 6.73 | 6.52 | 6.53 | 6.533 | 6.538 |
| PIGMENT A | 4.835 | 4.664 | 4.667 | 4.671 | 4.675 |
| Filled Ratio A/100B | 72 | 74 | 74 | 74 | 74 |
| Index | 130 | 130 | 130 | 130 | 130 |
| Cream Time (s) | 19 | 16 | 23 | 19 | 18 |
| Gel Time (s) | 59 | 76 | 98 | 109 | 68 |
| Tack Time (s) | 75 | 106 | 180 | 151 | 93 |
| Free Rise Density (pcf) | 10.01 | 9.87 | 9.14 | 10.40 | 10.16 |
| Machine or Lab | Machine | Machine | Machine | Machine | Machine |
| Polyol Temperature (° F.) | 120 | 120 | 120 | 120 | 120 |
| Iso Temperature (° F.) | 87 | 87 | 77 | 87 | 87 |
| Mold Temperature (° F.) | 140 | 140 | 140 | 140 | 140 |
| Demold Time (min) | 15 | 15 | 15 | 15 | 15 |
| Type Of Sample | ½" Panel | ½" Panel | ½" Panel | ½" Panel | ½" Panel |

The systems were formulated such that the amount of isocyanate used in each run was kept relatively constant (72-74). The amounts of each of the polyol which was used were varied so that the OH# of the final blends was kept constant (i.e. between about 432 and 441). The amounts of flame retardants were kept constant at about 26% by weight of the final polymer weight. Panels were molded at the same density using the same conditions.

The rigid foams made were subjected to drop tower impact testing, evaluated in a 48"×6" tunnel (simulation of ASTM E-84) and cone calorimeter (ASTM E1354) flame resistance tests. The results are summarized below in Table II.

TABLE II

| Test | Ex. 1 | Ex. C2 | Ex. C3 | Ex. C4 | Ex. C5 |
|---|---|---|---|---|---|
| Thickness (in) | 0.522 | 0.523 | 0.524 | 0.522 | 0.523 |
| Density (lb/ft$^3$) | 18 | 18 | 18 | 18 | 18 |
| Cone Calorimeter (ASTM E1354) Total heat evolved (kJ) | 744.0 | 735.5 | 758.5 | 916.5 | 647.4 |
| Drop tower impact at 18 J (deflection at max load) (mm)[1] | 6.645 | Sample[3] shattered | Sample[3] shattered | Sample[3] shattered | Sample[3] shattered |
| [2]Mini-tunnel (simulated ASTM E84); amount of smoke generated | 508 | 483 | 569 | 544 | 548 |
| [2]Mini-tunnel (simulated ASTM E84); flame spread constant | 34 | 32 | 31 | 35 | 35 |
| [2]Mini-tunnel (simulated ASTM E84); maximum distance flame traveled (in) | 46 | 43 | 42 | 47 | 45 |

[1]Samples impacted on DynaTup Drop Tower using Class IV conditions with 2" diameter steel hemisphere with 6.35 kg mass at an impact energy of 18.6 J.
[2]Note:
The mini-tunnel is 6" wide and 48" long and is designed to simulate but not replace ASTM E84.
[3]Panel shattered into pieces upon impact so that no deflection could be determined.

As can be appreciated by reference to Table II, impact resistance is considerably improved in the inventive foam prepared in Ex. 1 compared to that of the comparative examples (Ex. C2-C5) while the flame resistant properties in all of the samples are very similar. The inventive formulations unexpectedly provided significantly improved impact resistance without decreasing flame retardant properties of the claimed polyurethane foam.

Impact resistance of Examples C4 and C5 was improved compared to Example C2, containing aromatic polyester polyol, by incorporating some flexible polyether polyol, but was still not as good as Example 1 made from the aliphatic polyester polyol of the present invention.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A fire-resistant, flexible, molded, medium density polyurethane foam comprising:
    a) 10 to 30 parts by weight of at least one polyester polyol having a functionality of from 1.5 to 3.0 and an OH number of from 25 to 250, and which comprises the reaction product of
        (i) one or more aliphatic dicarboxylic acids,
        with
        (ii) one or more diols or triols;

b) 5 to 15 parts by weight of at least one highly branched polyether polyol having a functionality of 3.0 to 8.0 and an OH number of 250 to 750 c) 5 to 15 parts by weight of at least one chain extender having a functionality of from 2.0 to 2.9 and an OH number of from 400 to 1900;

d) 30 to 55 parts by weight of a polymethylene poly(phenyl isocyanate), an isocyanate group containing prepolymer based on a polymethylene poly(phenyl isocyanate), or mixtures thereof, with said isocyanate component having an NCO group content of from 25 to 33% by weight;

e) 10 to 35 parts by weight of solid flame retardant; and f) a sufficient quantity of water to provide blowing to achieve a free rise density from 8 to 20 pcf in the resultant polyurethane foam, with the sum of the parts by weight of components a), b), c), d) and e) totaling 100 parts by weight.

2. The polyurethane foam of claim 1 which has a density of 10 to 30 pcf.

3. The polyurethane foam of claim 1, wherein b) said highly branched polyether polyol is prepared by alkoxylating sucrose or a mixture of sucrose with water and/or propylene glycol.

4. The polyurethane foam of claim 1, wherein e) said solid flame retardant comprises zinc borate.

5. The polyurethane foam of claim 4, wherein e) said solid flame retardant additionally comprises ammonium polyphosphate and/or alumina trihydrate.

6. The polyurethane foam of claim 5, wherein b) said highly branched polyether polyol is started from a compound which excludes trimethylolpropane.

7. The polyurethane foam of claim 1, which additionally comprises one or more liquid flame retardants.

8. The polyurethane foam of claim 1, wherein component d) is an isocyanate group containing prepolymer based on a polymethylene poly(phenyl isocyanate) which has an NCO group content of 27.5% to 32% and a NCO functionality of 2.1 to 3.8.

9. The polyurethane foam of claim 1, wherein a) said polyester polyol is free of polyethylene terephthalates.

10. The polyurethane foam of claim 1, wherein e) said solid flame retardant component is present in an amount of from 25 to 35 parts by weight.

11. A process of preparing a fire-resistant, flexible, molded, medium density polyurethane foam comprising:
(1) introducing a polyurethane foam forming composition into an open mold,
(2) closing the mold,
(3) allowing the composition to react, and
(4) removing the molded polyurethane foam from the mold, wherein the polyurethane foam forming composition comprises:

a) 10 to 30 parts by weight of at least one polyester polyol having a functionality of from 1.5 to 3.0 and an OH number of from 25 to 250, and which comprises the reaction product of
(i) one or more aliphatic dicarboxylic acids, with
(ii) one or more diols or triols;

b) 5 to 15 parts by weight of at least one highly branched polyether polyol having a functionality of 3.0 to 8.0 and an OH number of 250 to 750;

c) 5 to 15 parts by weight of at least one chain extender having a functionality of from 2.0 to 2.9 and an OH number of from 400 to 1900;

d) 30 to 55 parts by weight of a polymethylene poly(phenyl isocyanate), an isocyanate group containing prepolymer based on a polymethylene poly(phenyl isocyanate), or mixtures thereof, with said isocyanate component having an NCO group content of from 25 to 33% by weight;

e) 10 to 35 parts by weight of solid flame retardant; and f) a sufficient quantity of water to provide blowing to achieve a free rise density (FRD) from 8 to 26 pcf in the resultant polyurethane foam, with the sum of the parts by weight of components a), b), c), d), and e) totaling 100 parts by weight.

12. The process of claim 11, wherein said polyurethane foam has a density of 10 to 30 pcf.

13. The process of claim 11, wherein b) said highly branched polyether polyol is prepared by alkoxylating sucrose or a mixture of sucrose with water and/or propylene glycol.

14. The process of claim 11, wherein e) said solid flame retardant comprises zinc borate.

15. The process of claim 14, wherein e) said solid flame retardant additionally comprises ammonium polyphosphate and/or alumina trihydrate.

16. The process of claim 15, wherein b) said highly branched polyether polyol is started from a compound which excludes trimethylolpropane.

17. The process of claim 11, which additionally comprises one or more liquid flame retardants.

18. The process of claim 11, wherein component d) is an isocyanate group containing prepolymer based on a polymethylene poly(phenyl isocyanate) which has an NCO group content of 27.5% to 32% and a NCO functionality of 2.1 to 3.8.

19. The process of claim 11, wherein a) said polyester polyol is free of polyethylene terephthalates.

20. The process of claim 11, wherein e) said solid flame retardant component is present in an amount of from 25 to 35 parts by weight.

* * * * *